United States Patent
Landsman et al.

(10) Patent No.: US 8,156,098 B1
(45) Date of Patent: Apr. 10, 2012

(54) GENERATING AND IMPLEMENTING A-LISTS TO MANAGE USER RELATIONSHIPS

(75) Inventors: Richard A. Landsman, Scotts Valley, CA (US); William G. Wetherell, San Francisco, CA (US); David Gee Louie, Mountain View, CA (US); Karl Andrew Dotter, San Francisco, CA (US); Richard T. Kramer, San Ramon, CA (US)

(73) Assignee: AOL Inc., Dulles, VA (US)

( * ) Notice: Subject to any disclaimer, the term of this patent is extended or adjusted under 35 U.S.C. 154(b) by 420 days.

(21) Appl. No.: 12/110,052

(22) Filed: Apr. 25, 2008

Related U.S. Application Data

(60) Provisional application No. 60/914,751, filed on Apr. 29, 2007.

(51) Int. Cl.
G06F 17/30 (2006.01)

(52) U.S. Cl. ........ 707/706; 707/708; 707/769; 707/770; 707/783; 707/784; 707/785

(58) Field of Classification Search .................. 707/3, 9, 707/10, 104.1, 999.003, 999.009, 999.01, 707/999.107, 708, 706, 769, 770, 783, 784, 707/785; 709/204, 205
See application file for complete search history.

(56) References Cited

U.S. PATENT DOCUMENTS

| | | | | |
|---|---|---|---|---|
| 6,525,747 B1 * | 2/2003 | Bezos | ............................ | 715/751 |
| 6,593,949 B1 * | 7/2003 | Chew et al. | .................... | 715/841 |
| 6,677,968 B1 * | 1/2004 | Appelman | .................... | 715/853 |
| 6,680,675 B1 * | 1/2004 | Suzuki | .......................... | 340/988 |
| 6,820,083 B1 * | 11/2004 | Nagy et al. | ..................... | 707/783 |
| 6,832,245 B1 | 12/2004 | Isaacs et al. | | |
| 7,275,215 B2 * | 9/2007 | Werndorfer et al. | .......... | 715/752 |
| 7,289,814 B2 * | 10/2007 | Amir et al. | .................. | 455/456.1 |
| 7,571,228 B2 * | 8/2009 | Classen et al. | ................ | 709/224 |
| 7,590,695 B2 * | 9/2009 | Landsman et al. | ............ | 709/206 |
| 7,590,696 B1 * | 9/2009 | Odell et al. | ..................... | 709/206 |
| 7,606,580 B2 * | 10/2009 | Granito et al. | ............... | 455/456.1 |
| 7,620,404 B2 * | 11/2009 | Chesnais et al. | ............ | 455/456.1 |
| 7,631,266 B2 * | 12/2009 | Werndorfer et al. | .......... | 715/752 |
| 7,675,903 B2 * | 3/2010 | Ozugur et al. | ................ | 370/352 |
| 7,685,530 B2 * | 3/2010 | Sherrard et al. | ............. | 715/764 |
| 7,761,549 B2 * | 7/2010 | Farnham et al. | ............. | 709/223 |
| 7,792,789 B2 * | 9/2010 | Prahlad et al. | ............... | 707/608 |
| 7,797,642 B1 * | 9/2010 | Karam et al. | ................. | 715/810 |
| 8,032,549 B2 * | 10/2011 | Gropper | ....................... | 707/770 |
| 2002/0111173 A1 * | 8/2002 | Hendrey et al. | ............... | 455/456 |
| 2003/0065721 A1 * | 4/2003 | Roskind | ....................... | 709/204 |
| 2003/0208409 A1 * | 11/2003 | Mault | ............................ | 705/26 |
| 2003/0220975 A1 * | 11/2003 | Malik | ........................... | 709/205 |
| 2004/0198398 A1 * | 10/2004 | Amir et al. | ................ | 455/456.6 |
| 2004/0203977 A1 * | 10/2004 | Kennedy | ....................... | 455/518 |
| 2004/0225679 A1 * | 11/2004 | Oran | ......................... | 707/104.1 |
| 2005/0172001 A1 * | 8/2005 | Zaner et al. | ................... | 709/205 |

(Continued)

*Primary Examiner* — Thanh-Ha Dang
(74) *Attorney, Agent, or Firm* — Finnegan, Henderson, Farabow, Garrett & Dunner, LLP

(57) ABSTRACT

Methods, systems, and computer program products for dynamically generating and displaying a contacts list for one or more services of a computing system. The method may include identifying one or more contacts having associated contact information. The contacts may be associated with a user of the computing system and may be identified across one or more information services or sources associated with the computing system. The method may also include determining a subset of the contacts and associated contact information based on a set of predefined criteria; generating a list of the subset of contacts and associated contact information; and displaying the generated list of contacts and associated contact information on a user interface.

17 Claims, 14 Drawing Sheets

U.S. PATENT DOCUMENTS

| | | | |
|---|---|---|---|
| 2006/0046740 A1* | 3/2006 | Johnson | 455/456.1 |
| 2006/0047576 A1* | 3/2006 | Aaltonen et al. | 705/26 |
| 2006/0136584 A1* | 6/2006 | Decker et al. | 709/224 |
| 2007/0067392 A1* | 3/2007 | Torres et al. | 709/206 |
| 2007/0168447 A1* | 7/2007 | Chen et al. | 709/207 |
| 2008/0109317 A1* | 5/2008 | Singh | 705/14 |
| 2008/0114716 A1* | 5/2008 | Mock | 707/1 |
| 2008/0231507 A1* | 9/2008 | Burckart et al. | 342/357.08 |
| 2008/0235242 A1* | 9/2008 | Swanburg et al. | 707/10 |
| 2008/0242277 A1* | 10/2008 | Chen et al. | 455/414.2 |
| 2008/0263076 A1* | 10/2008 | Duffield et al. | 707/102 |
| 2009/0164598 A1 | 6/2009 | Nelson et al. | |
| 2010/0037144 A1* | 2/2010 | Vance et al. | 715/739 |
| 2010/0042941 A1* | 2/2010 | Vance et al. | 715/764 |

* cited by examiner

GENERATING AND IMPLEMENTING A-LISTS TO MANAGE USER RELATIONSHIPS

CROSS-REFERENCE TO RELATED APPLICATIONS

This patent application claims the benefit of U.S. Provisional Application No. 60/914,751, filed Apr. 29, 2007, which is incorporated herein by reference in its entirety.

BACKGROUND

The ability to socially network with contacts has always been important in business and personal relationships. With the digital age has come new ways to discover information about people to help in maintaining relationships. In addition to traditional ways of maintaining relationships with people, such as telephone, email, text messaging, and instant messaging, new social networking technologies have been rapidly developing such as RSS feeds, blogging, and Voice over IP (VoIP). In addition, a plethora of websites have entered the cultural mainstream that allow users to have their own virtual personality, such as personal web pages, myspace.com, friendster.com, and the like. Other sources of social information exist that will be described in further detail below.

However, while these traditional and developing methods of identifying social information for a contact are beneficial, keeping up with social information requires a large amount of time and effort because a user must largely access separate applications. For a particular contact, suppose a contact in a regular week maintains social networking with a contact via the following ways: sending email, IM, by mobile phone, reviewing the contact's blog, looking at the contact's myspace.com page and also keeping up with an RSS feed that the contact publishes. In order to do this, the user generally has to access an email application, an IM application, a mobile phone, a blog website, a myspace.com website, and an RSS feed reader. Thus, keeping up with one's social contacts can be quite time consuming.

BRIEF SUMMARY

The principles of the present invention relate to methods, systems, and computer program products for dynamically generating and displaying a contacts list for one or more services of a computing system. The method comprises identifying one or more contacts having associated contact information, the one or more contacts being associated with a user of the computing system, wherein the one or more contacts are identified across one or more information services or sources associated with the computing system; determining a subset of the one or more contacts and associated contact information based on a set of predefined criteria; generating a list of the subset of contacts and associated contact information; and displaying the generated list of contacts and associated contact information on the user interface.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teaching herein. The features and advantages of the teaching herein may be realized and obtained by means of the instruments and combinations particularly pointed out in the appended claims. These and other features will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

The principles of the present invention are related to the generation and use of one or more "A-lists." An A-list embodies a visual paradigm where a designated set of primary contacts (i.e., individual(s), group(s), or entity(ies)) can be associated with various social information represented by one or more social indicators. Thus, an A-list represents an aggregate of social groups that can be used for a variety of communication, and thus differs from a mere distribution list, which is typically used only to send email or the like.

An A-list may be generated and/or updated based on one or more defined criteria. Such criteria may include, but is not limited to, frequent activity, message content, location, domain, or any other desired criteria or combination of criteria. In addition, an A-list may include more information than a traditional contacts list, which typically only includes contact information like an email address, IM address, and phone number. For example, an A-list may include video feeds, pictures, audio feeds, and other information feeds to name a few of the numerous other types of information that may be included besides the traditional contact information. In addition, an A-list may also display information about the status of a member of the A-list.

Further, an A-list is able to work across multiple communication services and/or modes of communication. For instance, a user may generate an A-list that covers only one email service. Alternatively, an A-list may cover several different email services or may cover several modes of communication such as an email service and an instant message (IM) service. In this way, a user may use the A-list to initiate communication across various communication modes such as IM, email, text messaging service (SMS), and phone communication simultaneously if desired.

In the claims and in the specification, a contact is defined to mean an individual(s), person(s), organization(s), group(s), entity or entities, or any combination thereof. A contact may also be referred to as a member of an A-list in the claims and specification.

A contact may have contact information that is associated with the contact, the contact information being defined in the claims and specification to include what is considered traditional contact information such as email information, IM information, text messaging information, and phone information and to also include all other types of social information such as, but not limited to, video feeds, audio feeds, pictures, RSS feeds, and the like.

In the claims and in the specification, a user is defined to mean the owner of an A-list. In other words, it is one or more contacts of a user that are used when generating an A-list.

Operating Environment

Figure 1:
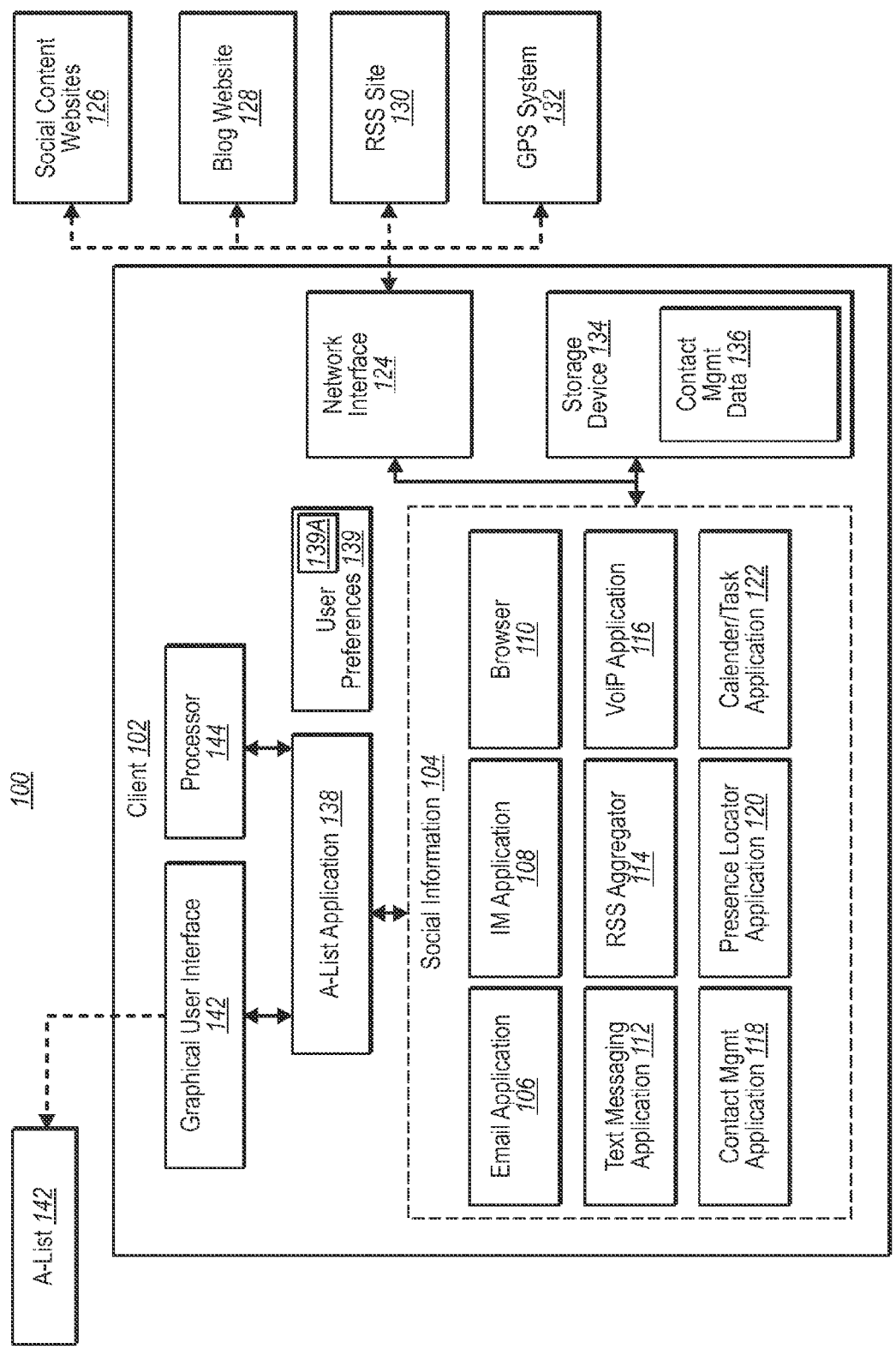
FIG. 1 illustrates an exemplary environment for implementing embodiments of the invention.

FIG. 1 is an exemplary network configuration for implementing systems and methods of the present invention. FIG. 1 illustrates an exemplary system 100 having a client 102. The client 102 generally refers to any general or special-purpose computer that implements a display such as, but not limited to, a phone, a desktop computer, a laptop computer, a handheld computer, a mobile computing device, a personal data assistant (PDA), and the like. Client 102 is configured to interface with various services or sources of social information 104.

Sources of social information 104 may include, but are not limited to, an email application 106, instant messaging application 108, browser 110, text messaging application 112, RSS aggregator 114, VoIP (and/or other phone) application 116, contact management application 118, presence locator application 120, and a calendaring/tasks application 122. Some or all of the sources of social information 104 can access a network connection using network interface 124 to access yet other ways to communicate with a contact. Other services that can be communicated to network interface 124 (via Internet, LAN, WAN, or other network) include, but are not limited to, social content sites 126, such as, but not limited to, myspace.com, electronic photo albums, electronic video albums, and the like, blog websites 128, an RSS site 130, and a GPS system 132.

Any of the sources of social information 104 may also access a storage device 134 located on client 102. For example, but not limited to, one or more sources of social information 104 may access contact management data 136 stored on storage device 134.

Any of the sources of social information 104 may include a traditional contact or distribution list that is used to organize a user's contacts for that source. Such contacts lists will generally include contact information about a person, organization, or the like, but do not include the other information sources like the A-lists of the present invention.

For example, email application 106 may include a contacts list that includes the email address of various people, organizations and the like (hereinafter also referred to as "entities) that a user may communicate with using email. IM application 108, text messaging application 112, and VoIP application 116 may include similar contact lists for communication using IM, text messaging, or phone calls respectively. Such contacts lists may be generated and maintained by contact management application 118. Of course, it will be appreciated that the other sources of social information 104 may also implement contact lists as circumstances warrant.

Returning to FIG. 1, system 100 further includes an A-list application 138. A-list application 138 consolidates the various contact information across the various services of system 100 and then generates the one or more A-lists as will be explained. A-list application 138 may access user preferences 139 which dictate certain user or default specified preferences for displaying the A-lists on a display as will be explained in more detail to follow. User preferences 139 may also include criteria 139A, which may be user defined or default defined, that is used by A-list application 138 in generating and/or updating the various A-lists.

The A-list application 138 sends data to the graphical user interface 140 that renders one or more A-lists 142 according to the executable instructions provided by the A-list application 138. A processor 144 is also involved in executing A-list application 138 and can be initiated in one embodiment when a user starts up a client computing device 102 so that the A-list application 138 is displayed upon start up.

Figure 2:
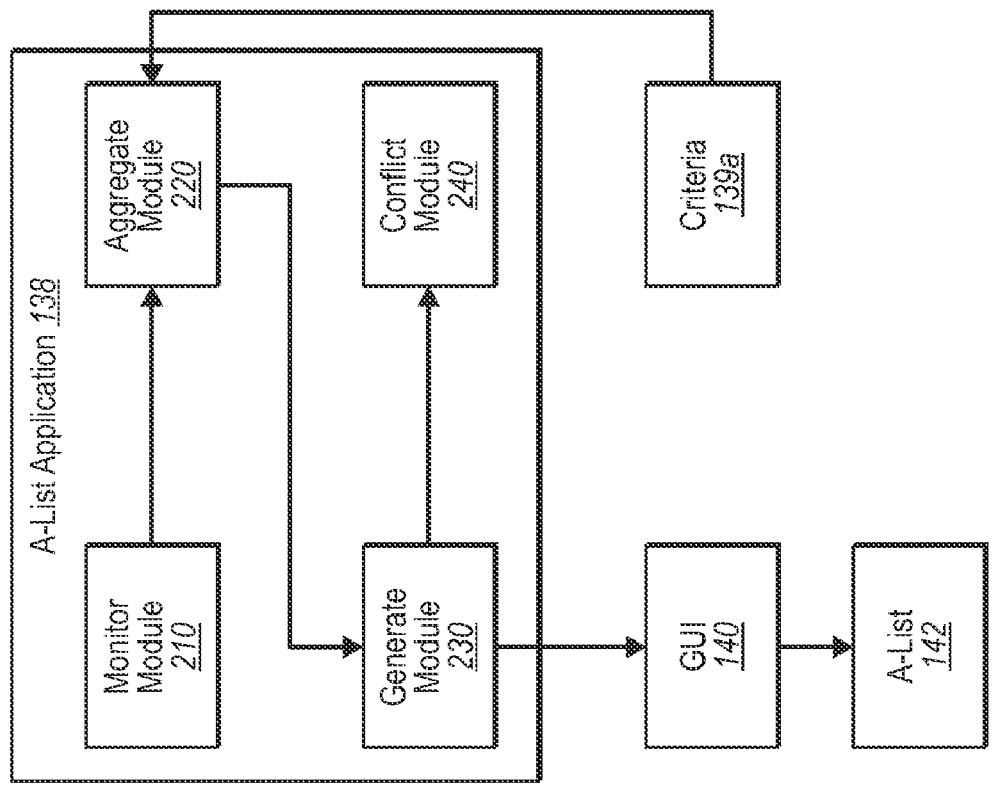
FIG. 2 illustrates an exemplary embodiment of an A-list application in accordance with the principles of the present invention.

Reference is now made to FIG. 2, which illustrates an example embodiment of A-list application 138. Note that the embodiment of FIG. 2 is only one of numerous embodiments that may be implemented by those of skill in the art. Accordingly, alternative embodiments may include more or less than the number of modules illustrated in FIG. 2.

As illustrated, A-list application 138 includes a monitor module 210. In operation, monitor module 210 is configured to identify one or more contacts and their associated contact information for communication with the user of system 100 across the various sources or services of system 100. In addition, monitor module 210 is configured to monitor existing A-lists for changes that may require updating the A-list and/or notifying the user. For example, monitor module 210 monitors for changes to contact and/or other types of contact information of a member of the existing A-list. In some embodiments, monitor module 210 may also be configured to monitor the on-line status of the members of the A-list.

The A-list application 138 also includes an aggregation module 220. In operation, the aggregation module 220 is configured to receive or otherwise access the contact information that was identified by monitor module 210. In addition, the criteria module 220 receives or otherwise accesses user criteria 139A from user preferences 139. Criteria 139A defines which contacts to access and also specifies what types of contact information to include for the members of the A-list. Examples of criteria 139A include frequent activity, message content, location, and domain.

Aggregation module 220 then identifies or determines a subset of the identified contact information based on the received criteria. Note that while identifying the subset of contact information, criteria module 220 may aggregate information across the various sources or services of system 100 into a single subset. In other words, the identified subset is not limited to contact information from a single source or service, but may include information from all of the sources or services or some smaller portion of the sources or services. In this way, the resulting A-list is more than simply a distribution list for a single source or service.

A generation module 230 is also included in A-list application 138. Generation module 230 receives or otherwise accesses the subset of contact information identified by aggregation module 220. Using this information, the generation module 230 generates an A-list that includes the identified subset.

In some embodiments, A-list application 138 may include a conflicts module 240. In operation, the conflicts module 240 is configured to arbitrate conflicts between user preferences as will be explained in more detail to follow.

Aspects of an A-List

Having described a specific environment in which an A-list according to the principles of the present invention may be implemented, various novel aspects of an A-list will now be explained.

Implementing A-list application 138 allows for one or more A-lists to be dynamically generated based on numerous predefined criteria 139A. For instance, in one embodiment, a user may select as criteria 139A the top five contacts that the user emails most frequently. In such embodiments, A-list application 138 would identify the subset of contact information for email application 106 that corresponded to desired criteria and would then generate an A-list of the five top five email contacts. The A-list application 138 would then continue to monitor the A-list and replace any contacts that were no longer in the top five most frequently emailed with new contacts that met that criteria.

In other embodiments, the generated A-list may be based on the most frequent email usage across several different email providers. For example, a user may have an email account with more than one email provider such as AOL, Yahoo, Gmail, and the like. Advantageously, A-list application 138 is configured to monitor contact information across all of the email service providers and to generate an A-list that includes the top five most frequently emailed contacts across the various service providers. For instance, in one embodiment three of the top five most frequently emailed contacts may be emailed using an AOL email account, while one each may be emailed using the Yahoo and Gmail accounts. The generated A-list would reflect this usage.

At a later time period, the user's email usage may change such that only two of the most frequently emailed contacts are emailed using AOL, while two of the most frequently emailed contacts are emailed using Yahoo and one is still emailed using the Gmail account. In such embodiments, A-list application 138 would dynamically update the A-list by removing one of the contacts emailed with the AOL account and adding an entity emailed with the Yahoo account.

In other embodiments, A-list application 138 may generate an A-list based on a particular topic or keyword being discussed across different service providers. For instance, the particular topic or keyword would be specified by the user or dynamically by the system as criteria 139A. A-list application 138 would then dynamically identify those contacts associated with the topic or keyword. As with the other embodiments, an A-list specifying the identified contacts would then be generated. This A-list could also be updated as new contacts became associated with the particular topic or keyword and existing contacts no longer were associated with topic or keyword.

In still other embodiments, A-list application 138 may generate a transient or short lived A-list, usually based on a specific time or location criteria. For example, A-list application 138 may utilize presence locator application 120 and GPS system 132 to identify and then generate an A-list of people within a five mile radius of the user that can be invited for drinks or the like. Once the invitation has been sent, the A-list may no longer be useful and may be removed by the system.

The principles of the present invention also allow for the generation of an A-list of contacts that are prohibited from contacting a user. Such an "anti-A-list" may be generated in the same manner as the other embodiments previously described. In other words, the user would select as criteria 139A those contacts that he or she would like to prohibit from contacting the user. Alternatively, the system may dynamically determine contacts to prohibit based on keywords or topics as has been explained. Those contacts that were part of the anti-A-list would then be blocked by the system from communicating with the user. The anti-A-list could be updated as circumstances warrant.

It will be appreciated that an A-list need not be dynamically generated as in the previously described embodiments, but may also be manually generated. For example, a user may manually add contact information to generate an A-list or to update an existing A-list. The user may also manually remove contacts that he or she no longer desires to be on the A-list. In some embodiments, it may be desirable for monitor module 210 or some other module to be configured to act as a house cleaning tool that monitors the manually added contacts. Any contacts on the A-list that have not been communicated with for a certain amount of time may then be removed from the A-list by the house cleaning tool to help ensure that the manually created A-list does not become to large.

In some embodiments, an A-list may be used for access control for managing a group website or the like. For instance, when generating the A-list, A-list application 138 may assign particular access rights and privileges to each member of the A-list. In other words, being on the A-list defines what access rights and privileges each member of the A-list has. Thus some members of the A-list may have full access to the group website while other members have access to only a portion of the group websites.

The principles of the present invention also allow for a user to generate more than one A-list. Thus, a user may generate, preferably dynamically but also manually as described, A-lists that cover various criteria of the user. For example, a user may have one A-list for frequently emailed contacts, another A-list based on a keyword or topic, and still a third A-list based on members of the user's soccer team or club. It will be appreciated that any number of A-lists may be generated as circumstances warrant.

In some embodiments, the principles of the present invention allow for the generation of a master A-list that encompasses one or more of a user's A-lists. For example, if a user had 20 A-lists based on various different criteria, he or she could generate a master A-list that included the top five most frequently used A-lists or the top five A-lists related to social clubs the user was a member of. Advantageously, use of a master A-list allows a user to quickly and easily communicate with members of multiple A-lists as will be described in more detail to follow.

A person or entity may also be a member of more than one A-list of a particular user. For example, one person who is a close friend of the user may be a member of an A-list that includes the top five most frequently emailed contacts. This same person however, may also be a member of an A-list that include the user's friends, and an A-list that includes members of the user's chess club. As will be appreciated, each of the A-lists will include contact information about the person that may be duplicated; for instance the same email address may be associated with the person in all three A-lists.

In addition, the members of an A-list, whether a member of a single A-list or a member of multiple A-lists, may have multiple contact information associated with them. For example, a person on an A-list may have one or more email addresses, one or more IM addresses, one or more text-messaging accounts, one or more phone numbers and the like associated with them. It will be appreciated, that such a circumstance raises questions about which contact information to use to contact the member of the A-list since it may not be desirable to use all of the different contact information to contact a particular member of the A-list.

Advantageously, the principles of the present invention allow A-list application 138 to set priorities that govern how the members of an A-list are to be contacted. In one embodiment, the user may define in preferences 139 the priority of which contact information to utilize. For example, in the scenario where a person or entity is a member of more than one A-list and the user desires to contact all the members of the multiple A-lists by email, the user may specify that only the email address in the first accessed A-list be used for that person or member to avoid sending duplicate emails. Alternatively, if the person or entity has more than one email address, the user may specify that one email address be used for one A-list and a second email be used for another A-list. The user may also simply specify that a single type of communication, such as email, be used to contact all members of an A-list or group of A-lists regardless of how many possible modes of communication the members of the A-list may be contacted by.

The user may also specify, in those scenarios where one or more members of an A-list or group of A-lists have multiple contact information for different communications modes, the priority of the communication mode. For example, the user may specify that an email be sent before a phone call or text message is sent. In any case, conflicts module 240 of A-list application 138 uses the specified preference to set the desired priority. It will be appreciated that numerous different priorities may be specified by the user as circumstances warrant.

In other embodiments, A-list application 138 may allow for members of a user's A-list to specify a preferred mode of communication and/or the priority of the mode of communication. This is especially helpful in those embodiments where the members of a user's A-list have contact information associated with them for more than one mode of communication. For example, a member of an A-list having both an email address and a phone number associated with him or her may specify that the email address is the preferred mode of communication when the user is trying to contact that member. Similarly, the member of the A-list may also specify that one email address be used over another or that one IM account be used over another. It will be appreciated that numerous different priorities may be specified by the members of the A-list as circumstances warrant.

In those embodiments where the members of the A-list are allowed to specify the priority, however, there may be occasions where the specified priority of the user (i.e., the owner of the A-list) and the specified priority of the member of the A-list are in conflict. In such circumstances, conflicts module 240 may be configured to arbitrate between the priorities to ascertain the priority of communication.

As has been previously described, an A-list may be dynamically changed based on the criteria 139A. In some embodiments, however, as the A-list dynamically changes, other settings and the like may also dynamically change. For example, an A-list of a user's close friends may begin to change in look and feel as new friends are added to the A-list and other friends are removed. Likewise, the default communication modes for a particular A-list may change as more new list members prefer communication using IM over the previously preferred email of the replaced list members. Accordingly, the principles of the present invention allow for changes to other setting in an A-list as the demographics of the A-list change.

In additional embodiments, A-list application 138 may be configured to aggregate communication across all members of an A-list for a particular communication type. For example, in one embodiment an A-list may include a tab or the like that, when pushed by the user, causes A-list application to initiate a telephone conference with all members of the A-list having phone contact information as will be described in more detail to follow. Similarly, the tab may cause A-list application 138 to initiate a broadcast message to be sent to all the members of the A-list with text messaging contact information. It will be appreciated that other communication modes may also be aggregated as described.

As mentioned, A-list application 138 is configured to monitor the generated A-list(s) for changes to information of one or members of the A-list. When these changes occur, A-list application 138 may generate automated notifications or alerts to notify the user of these changes. This also allows for a snapshot view of the current status of a user's A-list.

In some embodiments, A-list application 138 may include or have access to user configurable privacy setting that allows the user to set various levels of privacy. For example, the user may desire to have the system automatically notify a person or entity that they are included on one or more of the user's A-list. Further, the user may desire a low level of privacy that allows a contact to access or view the user's A-list(s) and to send messages to the members of the A-list. Alternatively, the user may desire a level of privacy that allows a contact viewing privileges, but not the ability to send messages to the members of the A-list. It will be appreciated that the configurable privacy setting may be set as to various levels as circumstances warrant.

In some embodiments, an A-list may be accessed for current status and the like by various means. For instance, a phone application may use an SMS query to the get the status of an A-list and then may use SMS to send a message to user's A-list or to the members of the A-list. In other embodiments, the user may program a phone to use short code with an A-list.

As will be appreciated, the user or owner of one or more A-lists may desire to include the A-list on more than one device. Accordingly, the principles of the present invention allow for an A-list or portions of the A-list to be exported to a different device. In addition, the user may copy an old A-list or portions of the A-list when creating a new A-list. Further, a user may use a current A-list as a basis for creating a new A-list. For example, an A-list of friends may be used to help create an A-list of a soccer team when several members of the friends A-list would also be included in the soccer team A-list.

Visual Representation of an A-List

As mentioned above in relation to FIG. 1, an A-list, for example A-list 142, may be displayed on a graphical user interface of a device such as system 100. In some embodiments, the visual A-list may be part of a social information graphical display panel such as a "People Panel" that shows various types of social information in a compact display. The social information graphical display panel may provide an aggregate view of content for all the members of the A-list. Displaying an A-list visually may be more useful in those environments such as a mobile environment wherein it may more useful to view the A-list content rather than open up a separate application such as an email application.

Figures 3A, 3B:
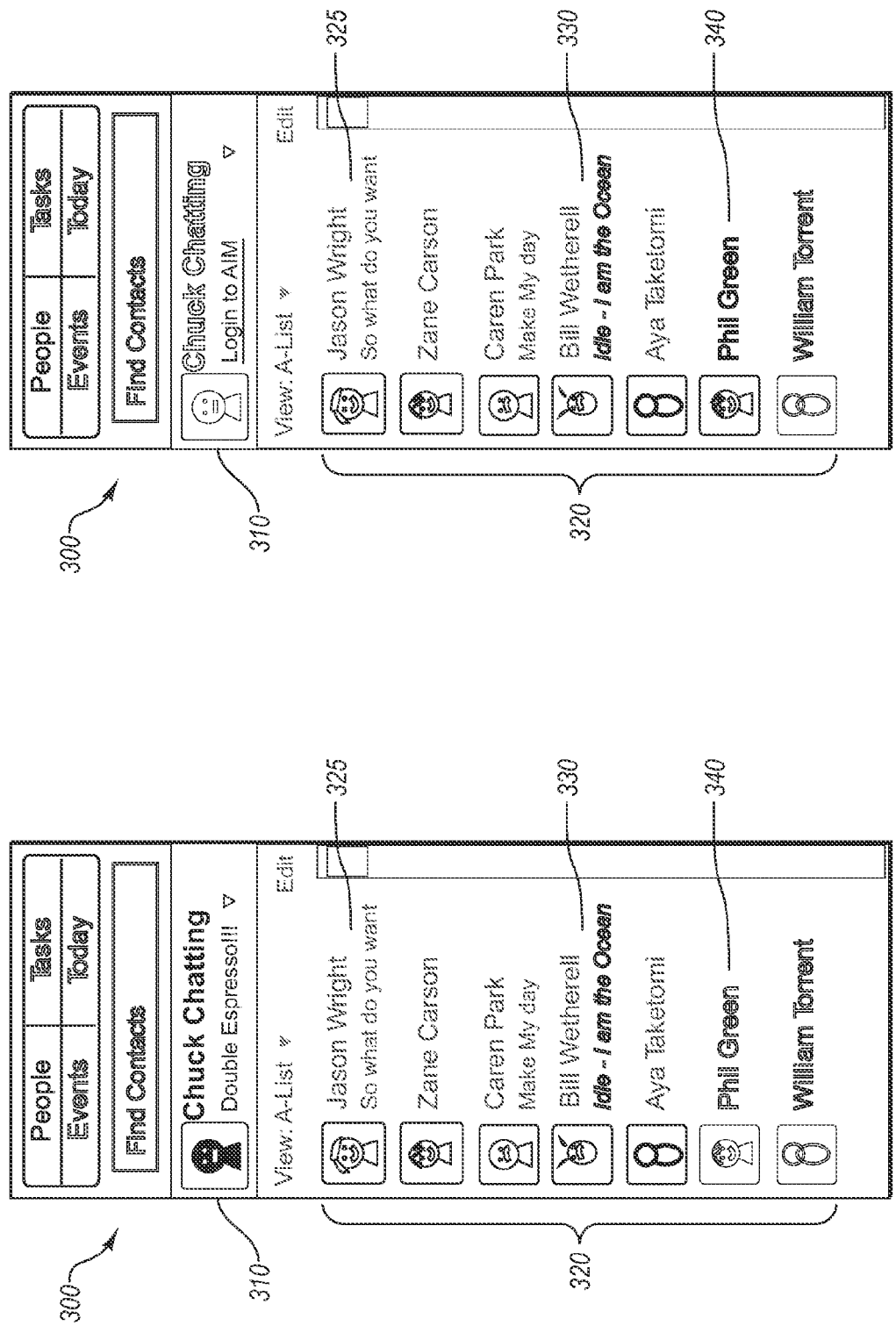
FIG. 3 illustrates an embodiment of a visual display of an A-list in accordance with the principles of the present invention.

Turning now to FIGS. 3A and 3B, an embodiment of a visual display of an A-list 300 is illustrated. As shown in FIG. 3A, A-list 300 includes various types of information about the members of the list. For example, A-list 300 may visually show information 310 about the user (i.e., the owner of the A-list), which in this embodiment shows that the user is on-line. The A-list 300 may also visually show information 320 about the members of the A-list 300. In the illustrated embodiment, the information 320 includes the identity of the members of the A-list and their current on-line status. For instance, list member 325 is shown to be currently active and may be contacted by at least IM. List member 330, on the other hand, is shown to be currently on-line, but unavailable for contact through IM. In contrast, list member 340 is shown to be currently off-line and thus not available to be contacted through means of communication requiring being on-line.

FIG. 3B shows similar information, except that information 350 shows that the user is currently off-line as indicated by the login icon. In addition, list member 340 is now shown to be on-line. As was mentioned previously, A-list application 138 may be configured to monitor the on-line status of the members of an A-list and then update this information on the A-list.

Figure 4B:
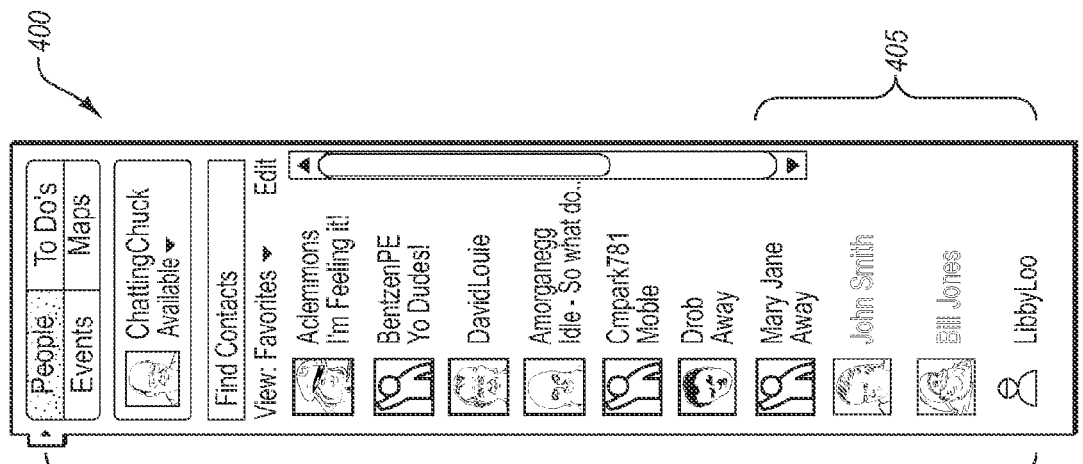
FIG. 4 illustrates an alternative embodiment of a visual display of an A-list in accordance with the principles of the present invention.
Figure 4A:
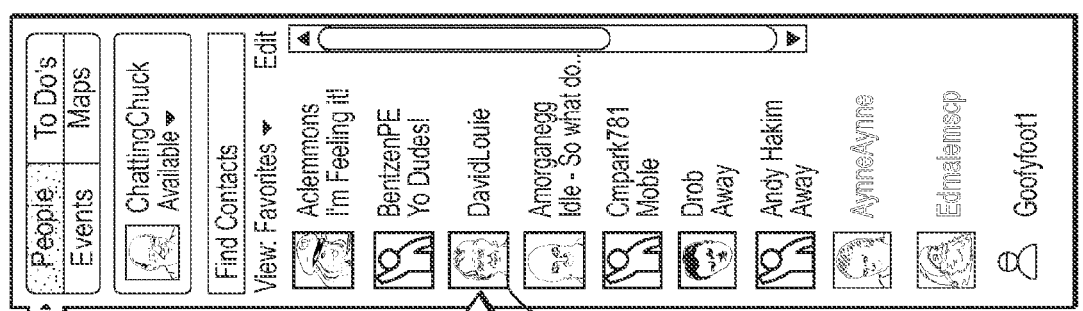

FIGS. 4A and 4B illustrate an additional visual embodiment of an A-list 400. FIG. 4A shows contacts or list members 405. FIG. 4A also shows the various types of contact information that can be included for a member of the A-list. As illustrated for a list member 406, A-list 400 may include an email address 410, a phone number 420 and IM information 440. Thus, the A-list is able to aggregate contact information across multiple communication sources or services as evidenced by the inclusion of email, phone, and IM information. As was previously described, the principles of the present invention allow the user and/or member of the A-list to specify the priority of which of these communications sources or services should be used for communication.

FIG. 4A also illustrates that the principles of the present invention allow an A-list to include social information in addition to traditional contact information. As shown, A-list 400 also includes pictures 430 that have been posted by list member 406. As previously mentioned, the A-list may also include other types of social information such as video feeds, audio feeds, RSS feeds and the like. Accordingly, an A-list may be configured to include numerous different types of social information in addition to traditional contact information. Note that although FIG. 4A shows the contact information associated with contact or list member 406 as being off to the side of the contact, this is simply one way to visually show this information. In other embodiments, the information may be integrated into the A-list below the name of the contact. One of skill in the art will appreciate that there are numerous ways to visually show this information.

Referring now to FIG. 4B, an alternative view of A-list 400 is illustrated. In this view, A-list 400 includes contacts or list members 405. However, some of the contacts have changed from the view of FIG. 4A. Specifically, contacts or list members 450 have been newly added to A-list 400 in place of several of the contacts shown in FIG. 4A. Accordingly, FIG. 4B shows that A-list 400 may be updated by A-list application 138 as was previously described. The changes may be made dynamically based on criteria 139A or the changes may be done manually as was also previously described.

Figure 5:
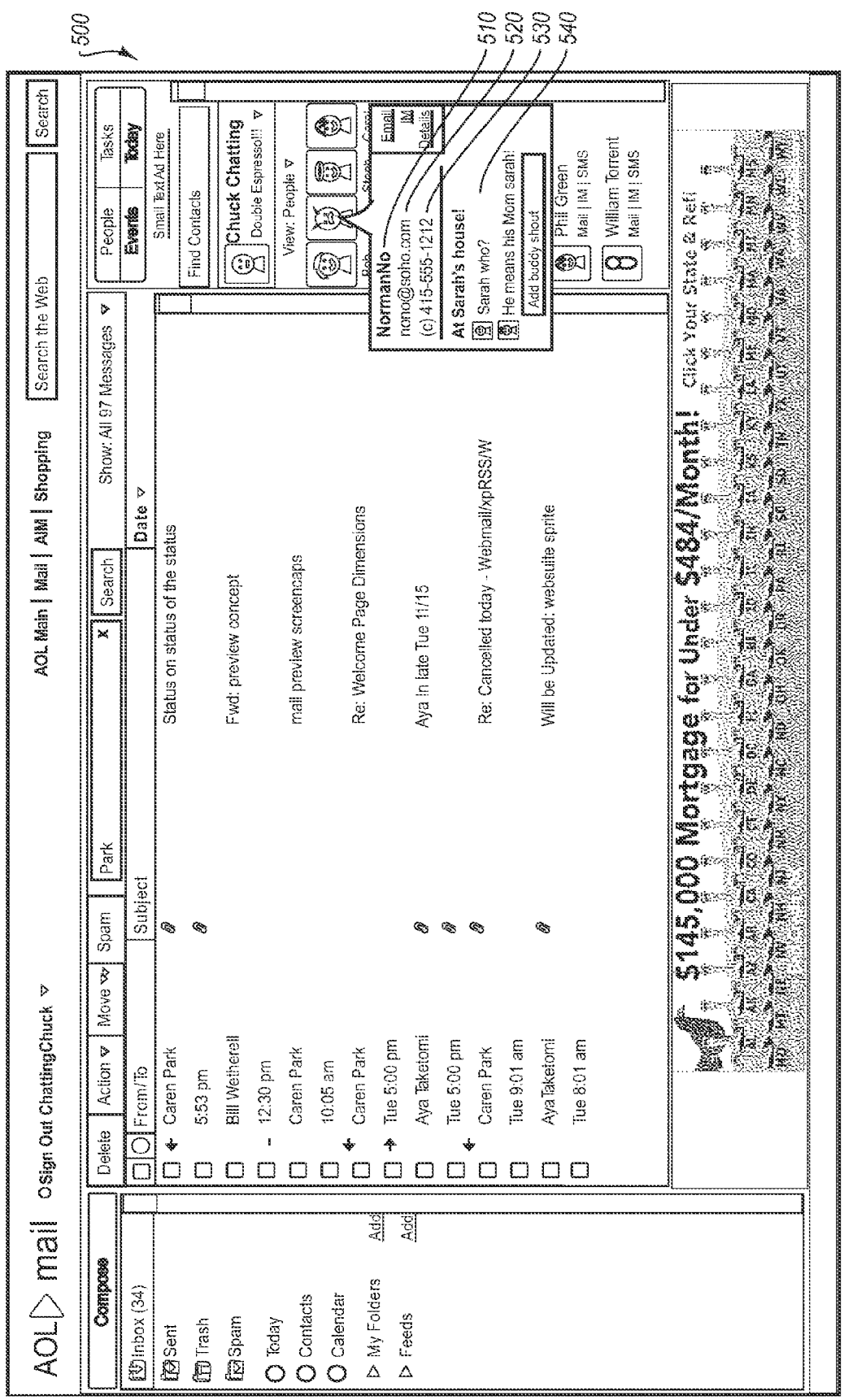
FIG. 5 illustrates an embodiment of an A-list implemented with an email application in accordance with the principles of the present invention.

Reference is now made to FIG. 5, which illustrates that an A-list may be implemented in the context of one or more of the various applications of system 100. As illustrated, an A-list 500 may be implemented with an email application, such as email application 106. As shown, when implemented with email application 106, A-list 500 may still include several different types of contact information that is aggregated across several different sources or services. A-list 500 includes a contact or list member 510 who has an email address 520, a phone number 530, and IM information 540.

Figure 4A:
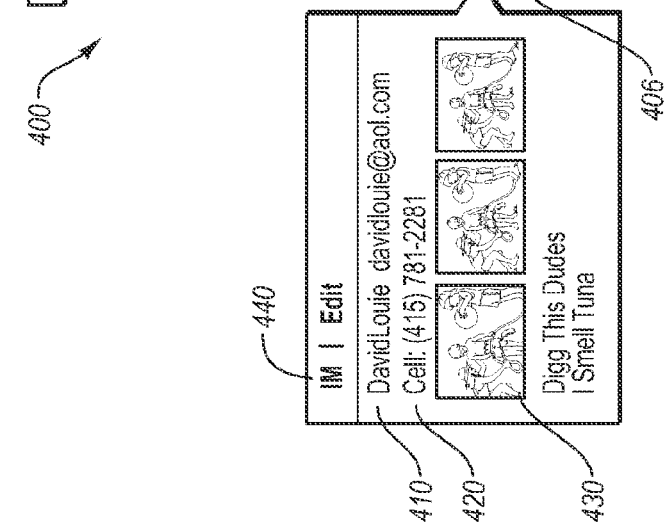

As illustrated in FIGS. 3-5, the visual displays of an A-list include one or more tabs or graphics relating to social information that can be used to initiate ways to socially connect with members of the A-list. Example include, but are not limited to, a tab or graphic indicating whether a list member is online, that, when clicked, initiates an instant messaging session; a tab or graphic indicating how many unread messages from a particular member of the A-list exist, and when clicked, can initiate an email application that displays the messages from this list member; a tab or graphic displaying the online/away status of the list member, and, when clicked, can initiate an IM session with the list member when online, a tab or graphic representing a myspace.com page for the list member, and, when clicked, can open a web browser page to view the list member's myspace.com page; a tab or graphic representing a list member's home page or blog, and, when clicked, can open a web browser page to view the list member's home page or blog; a tab or graphic displaying the location or implied presence of a list member using GPS, email, IM, or other location-based technology, and, when clicked, can open a mapping application and display locational information about the list member; and a tab or graphic indicating a telephone or mobile number for the list member, which, when clicked, can access a phone call to the list member (e.g., using VoIP) or can initiate a conference call between more than one member of the A-list.

At the same time as depicting certain types of social information visually, contact information can also be conveyed audibly. For example, when a member of the A-list sends an email, text message, or initiates an instant message, or updates his or her personal websites, an audible tone may be heard which indicates to a user that a change has occurred with regard to the contact information of one of the A-list members.

An A-list of the present invention can take on various forms, such as a panel displayed with an inbox, a widget displayed on a user's desktop. In addition, the A-list can be "portable", i.e. accessed via other forms of communication devices such as a phone (i.e. when running on a WAP device, be able to react to proximity of another selected device, etc.).

FIGS. 6A through 7D illustrate embodiments where an A-list is configured as a widget (webified mini-application) on a user's computing device. Such widgets may be given various design themes as desired by the user. For example, a user may specify in user preferences 139 that he or she desires a Hawaiian Surfer theme for an A-list. The user may also desire a guitar theme for other A-lists. It will be appreciated that a user may select numerous design themes as circumstances warrant.

Figure 6A:
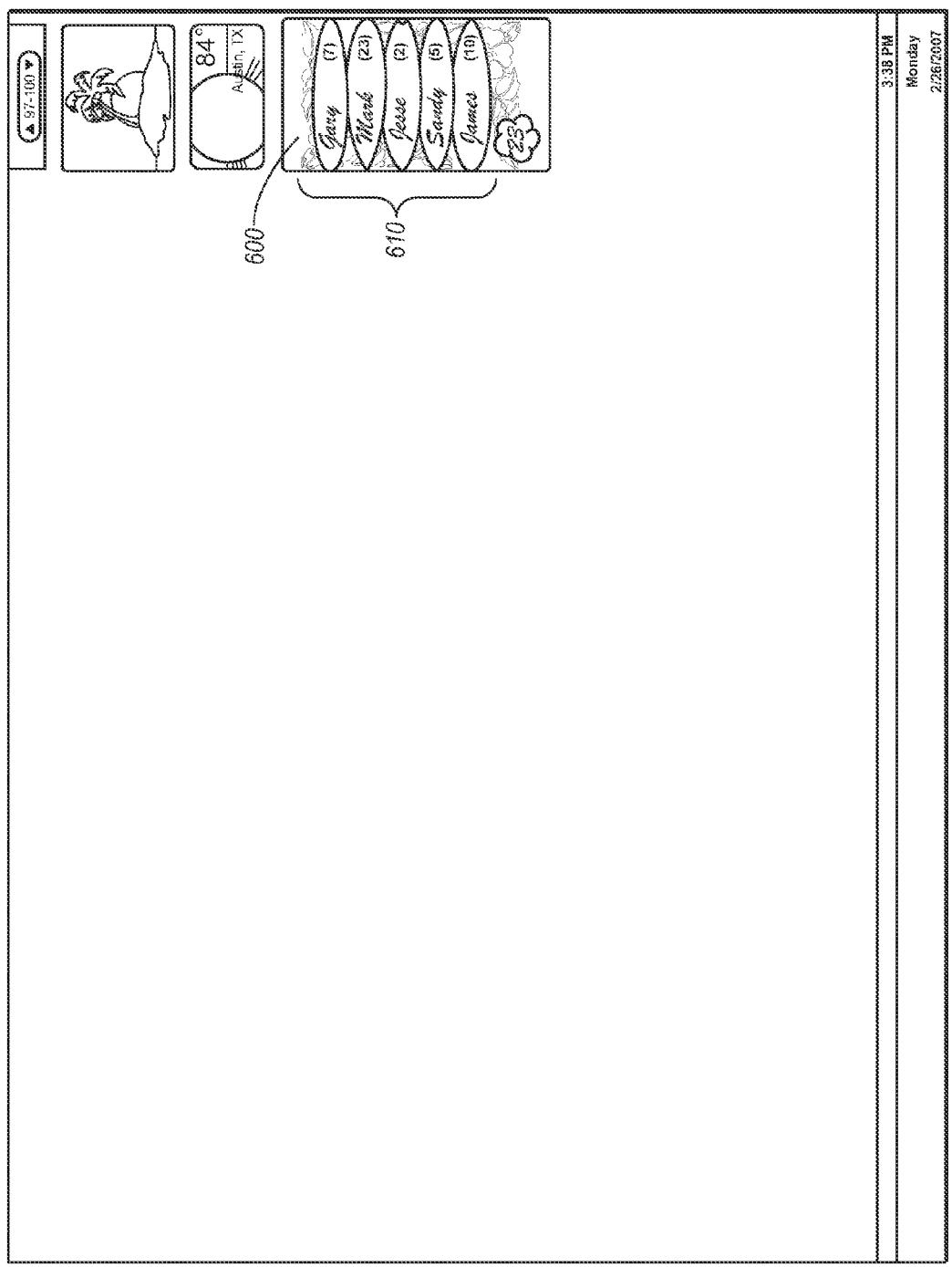
FIG. 6 illustrates an alternative embodiment of a visual display of an A-list in accordance with the principles of the present invention.

FIG. 6A illustrates an embodiment of the A-list widget 600 in which the names of the contacts or A-list members 610 appear on corresponding A-list, which has a Hawaiian Surfer theme.

Figure 6B:
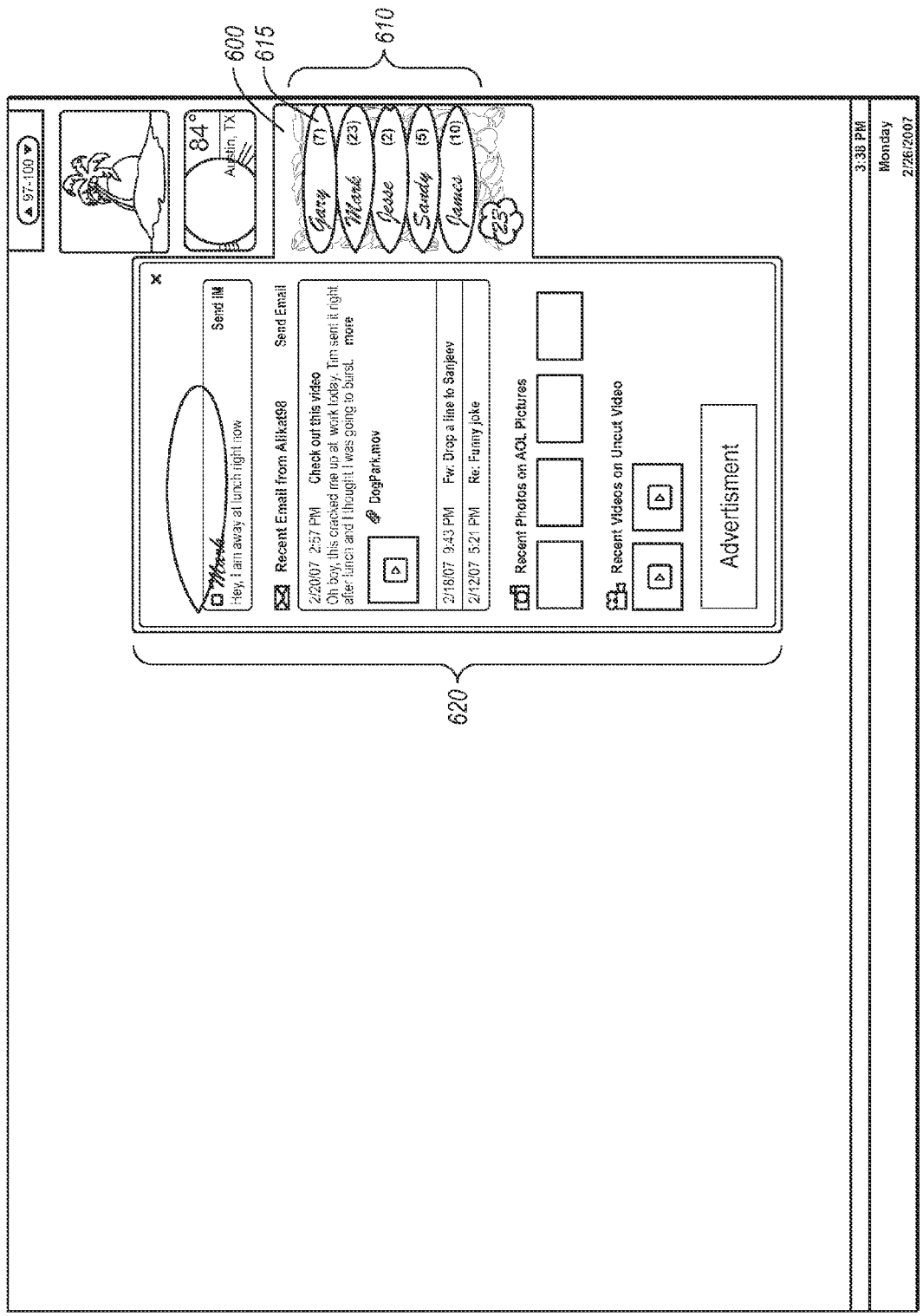
Figure 6C:
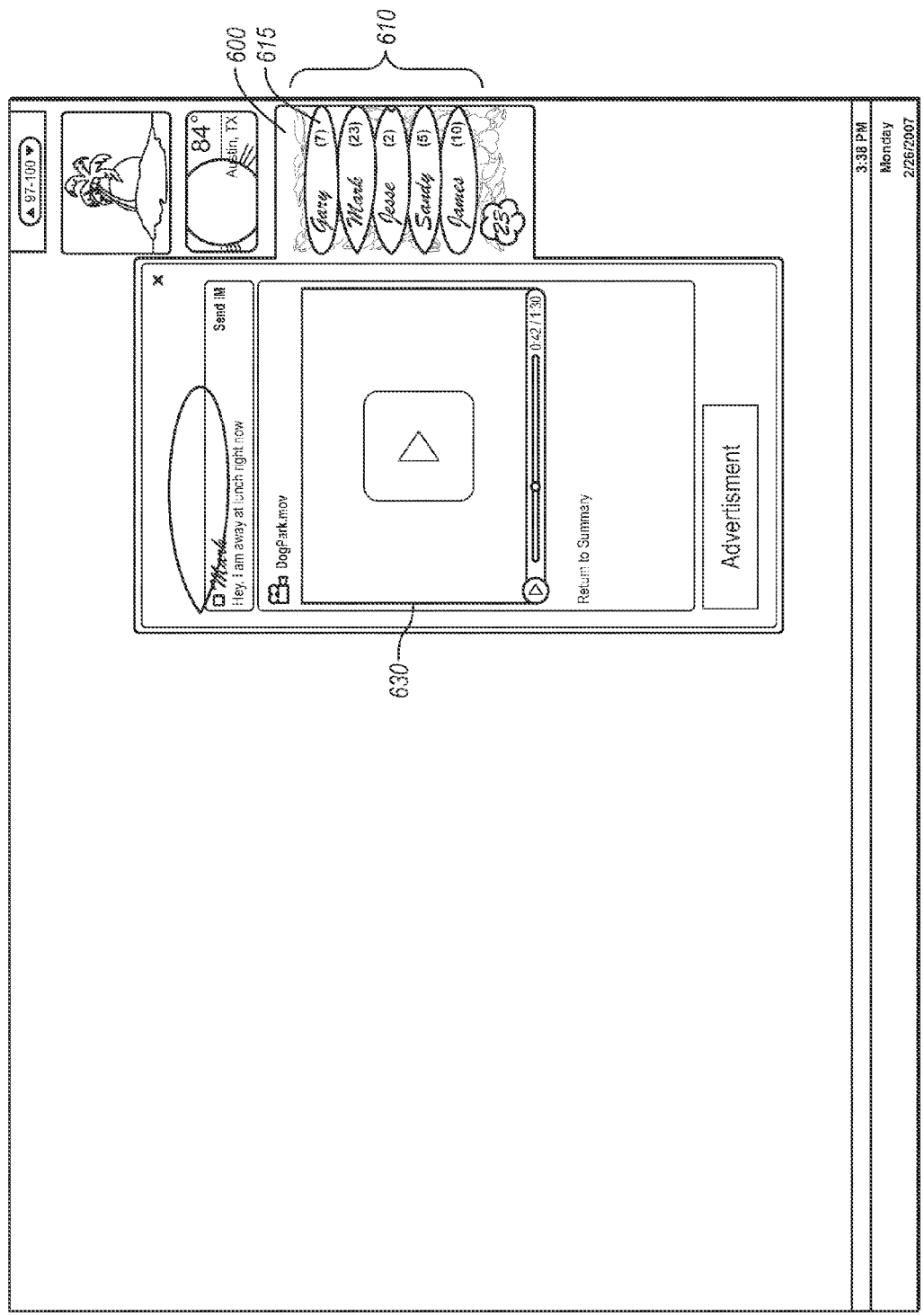

FIG. 6B illustrates that when a user hovers over a graphic associated with a particular list member 615, the A-list can depict more contact information 620 about the list member such as, but not limited to, the recent IM sessions, recent emails, recent photos from the contact's photo album, recent videos from a contact's video album, and the like.

The user can click on an IM, email, image, or photo to initiate corresponding ways to access, or view the contact information as previously described. Where a message contains a combination of text, photo, and/or video, where a thumbnail is provided for the photo or video, when a user selects the thumbnail, the A-list can display the photo or video directly, as shown at 630 in FIG. 6C.

Figure 6D:
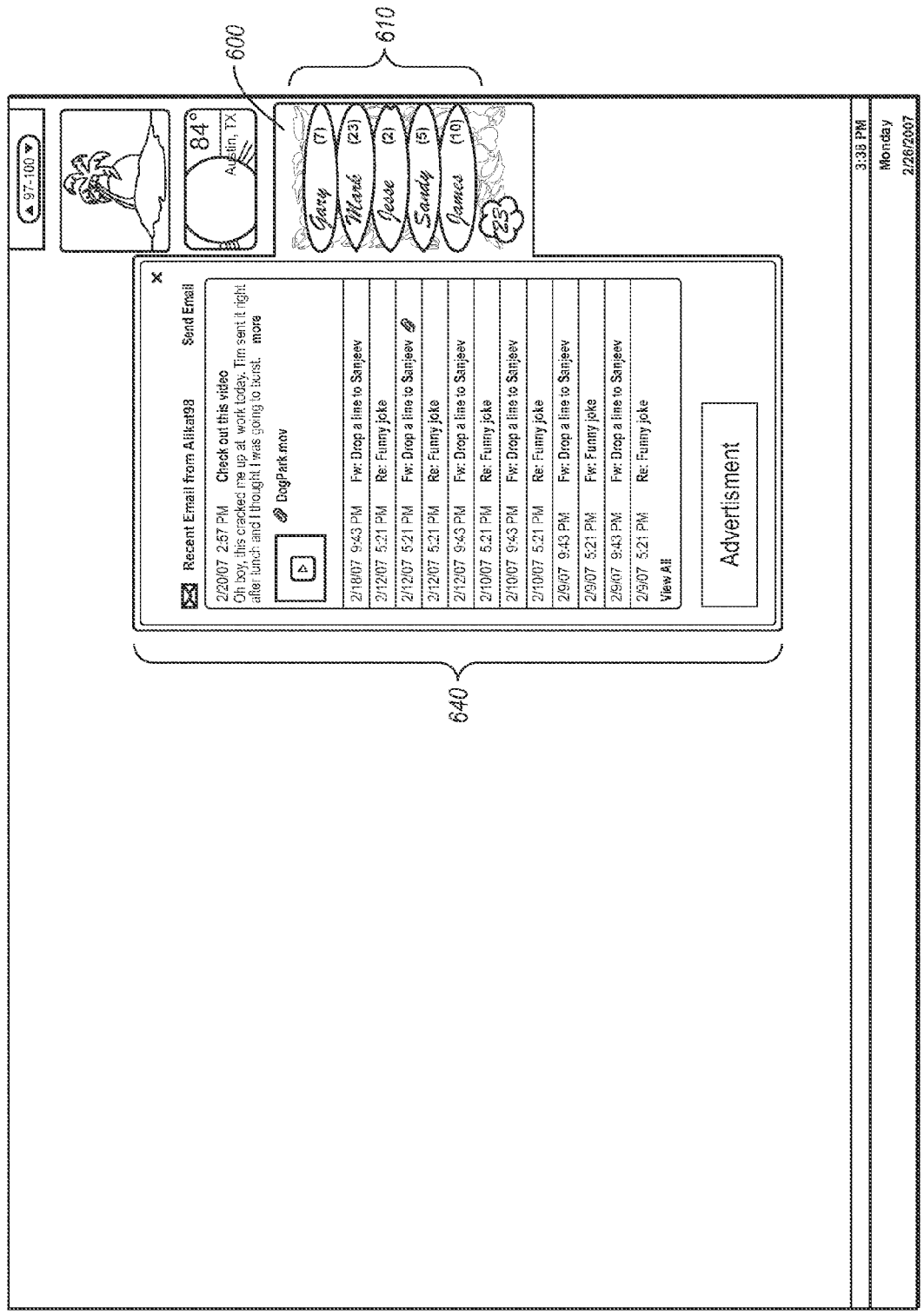

FIG. 6D illustrates that the A-list can display a graphic 640 indicating the total new messages, and, when clicked, a summary of the user's most recent emails can be displayed by the A-list 600.

Figure 7A:
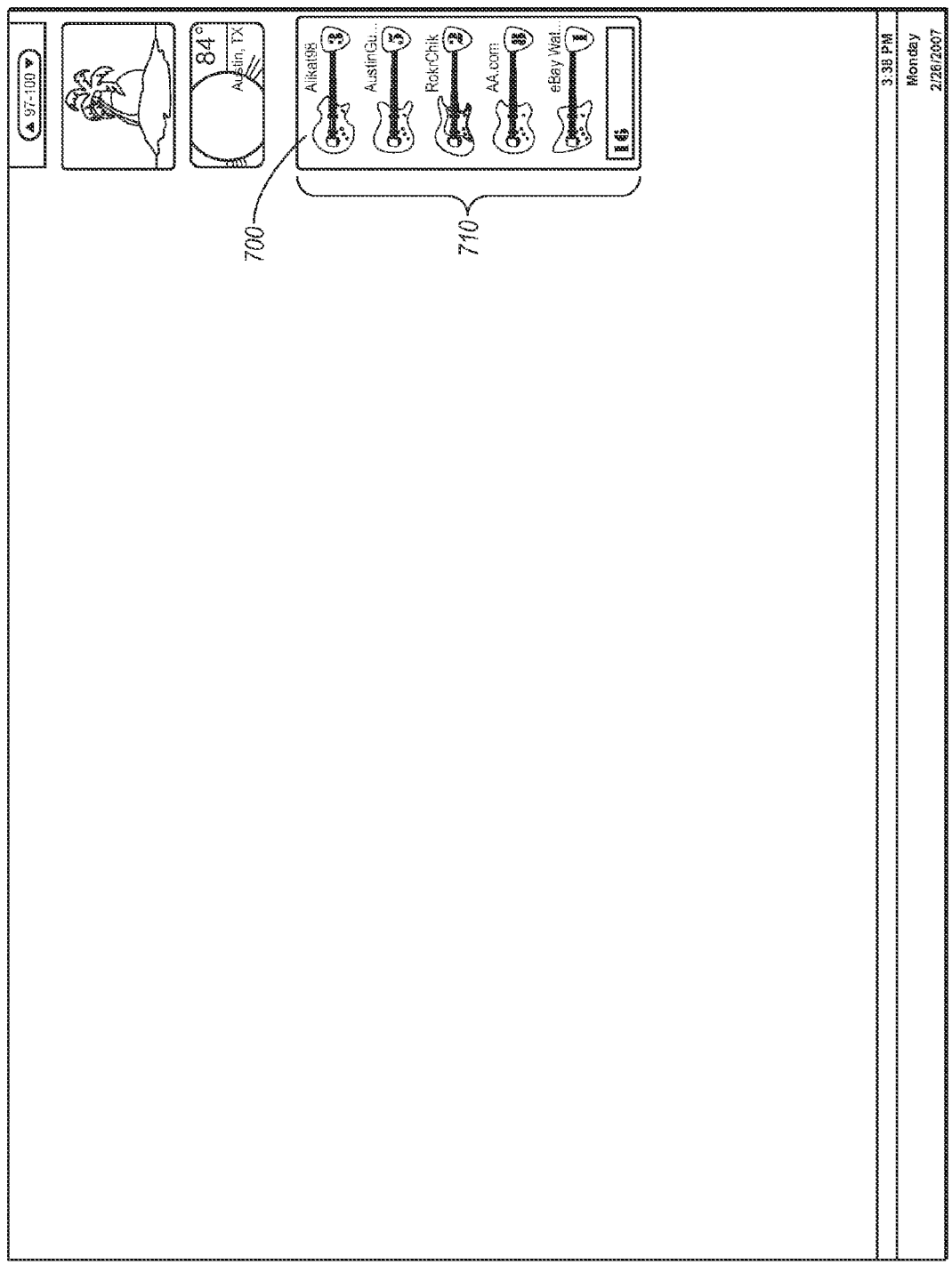
FIG. 7 illustrates an alternative embodiment of a visual display of an A-list in accordance with the principles of the present invention.

FIG. 7A illustrates an embodiment of the A-list widget 700 in which the names of the contacts or A-list members 710 appear on a corresponding A-list, which has an electric guitar theme.

Figure 7B:
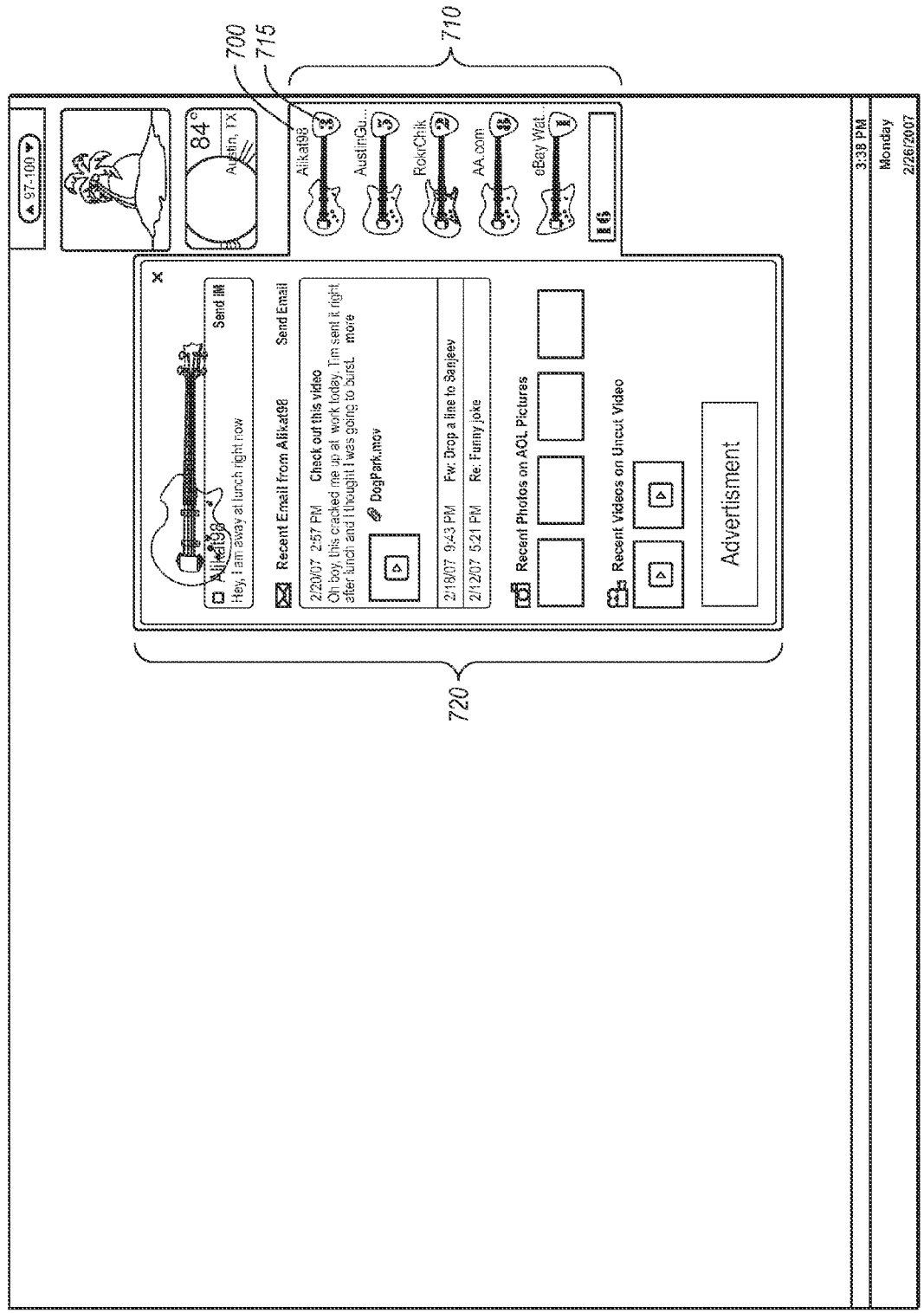
Figure 7C:
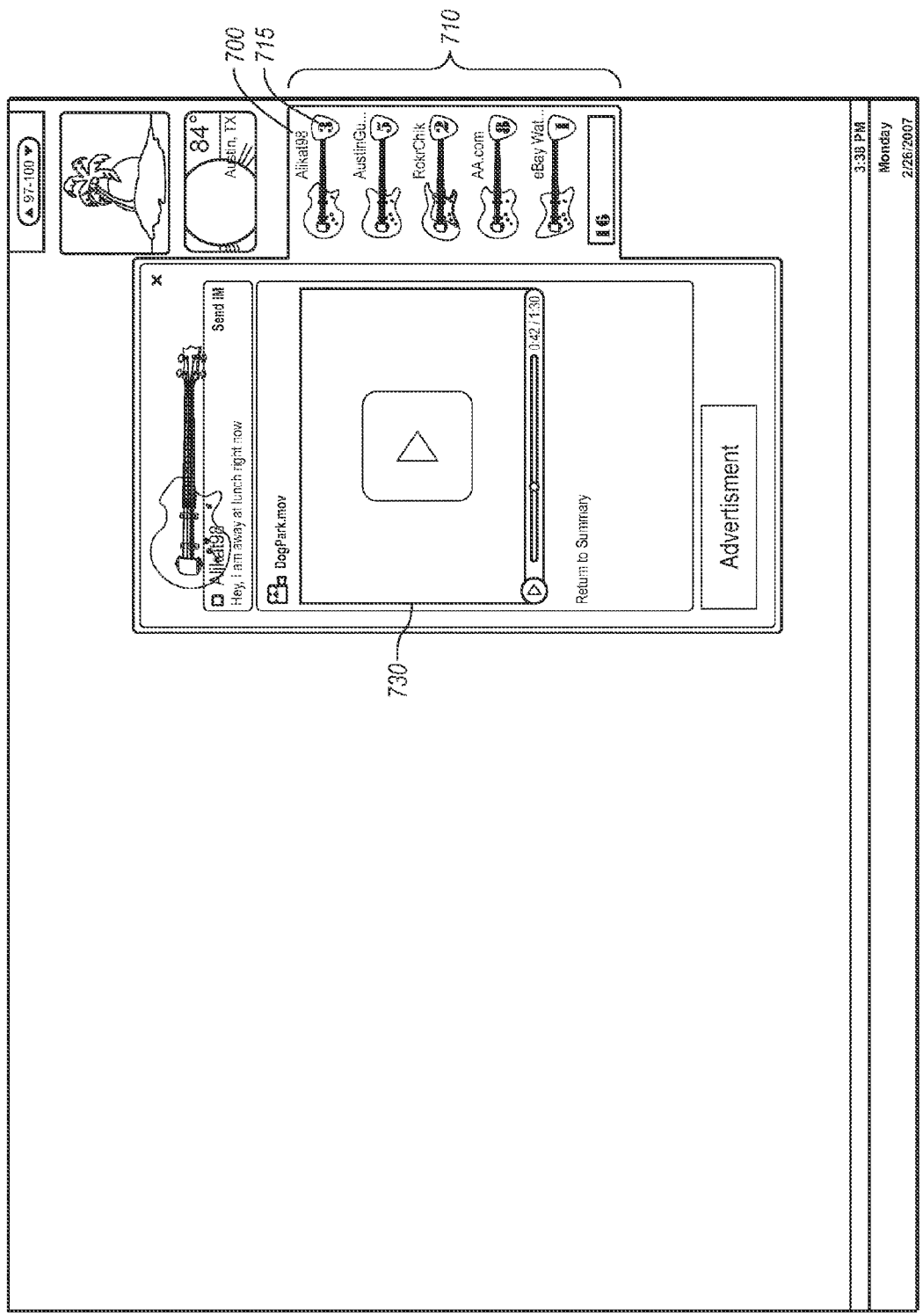

FIG. 7B illustrates that when a user hovers over a graphic associated with a particular list member 715, the A-list can depict more contact information 720 about the list member 715 such as, but not limited to, the recent IM sessions, recent emails, recent photos from the contact's photo album, recent videos from a contact's video album, and the like.

The user can click on an IM, email, image, or photo to initiate corresponding ways to access, or view the contact information as previously described. Where a message contains a combination of text, photo, and/or video, where a thumbnail is provided for the photo or video, when a user selects the thumbnail, the A-list can display the photo or video directly, as shown at 730 in FIG. 7C.

Figure 7D:
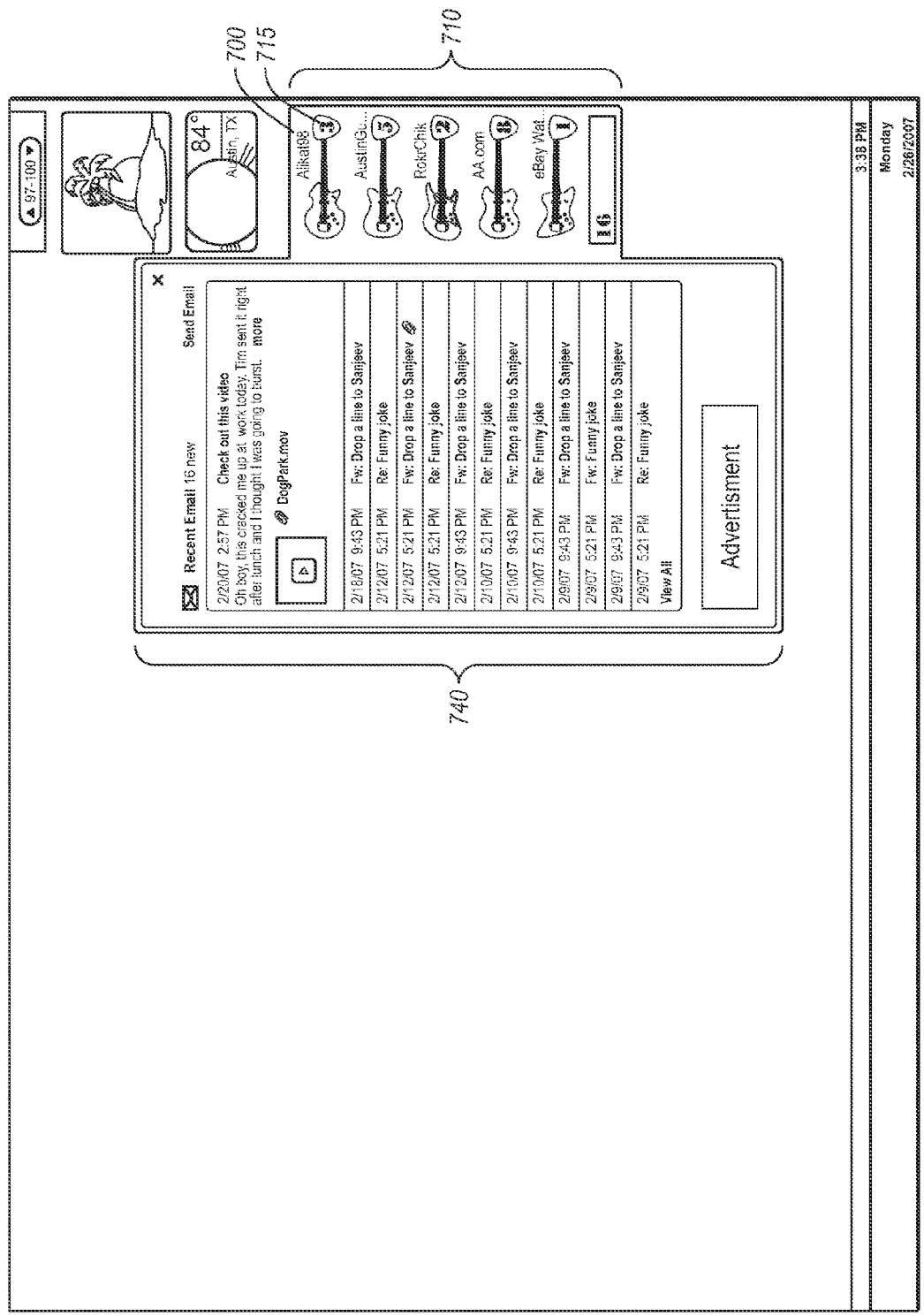

FIG. 7D illustrates that the A-list can display a graphic 740 indicating the total new messages, and, when clicked, a summary of the user's most recent emails can be displayed by the A-list 700.

Figure 8:
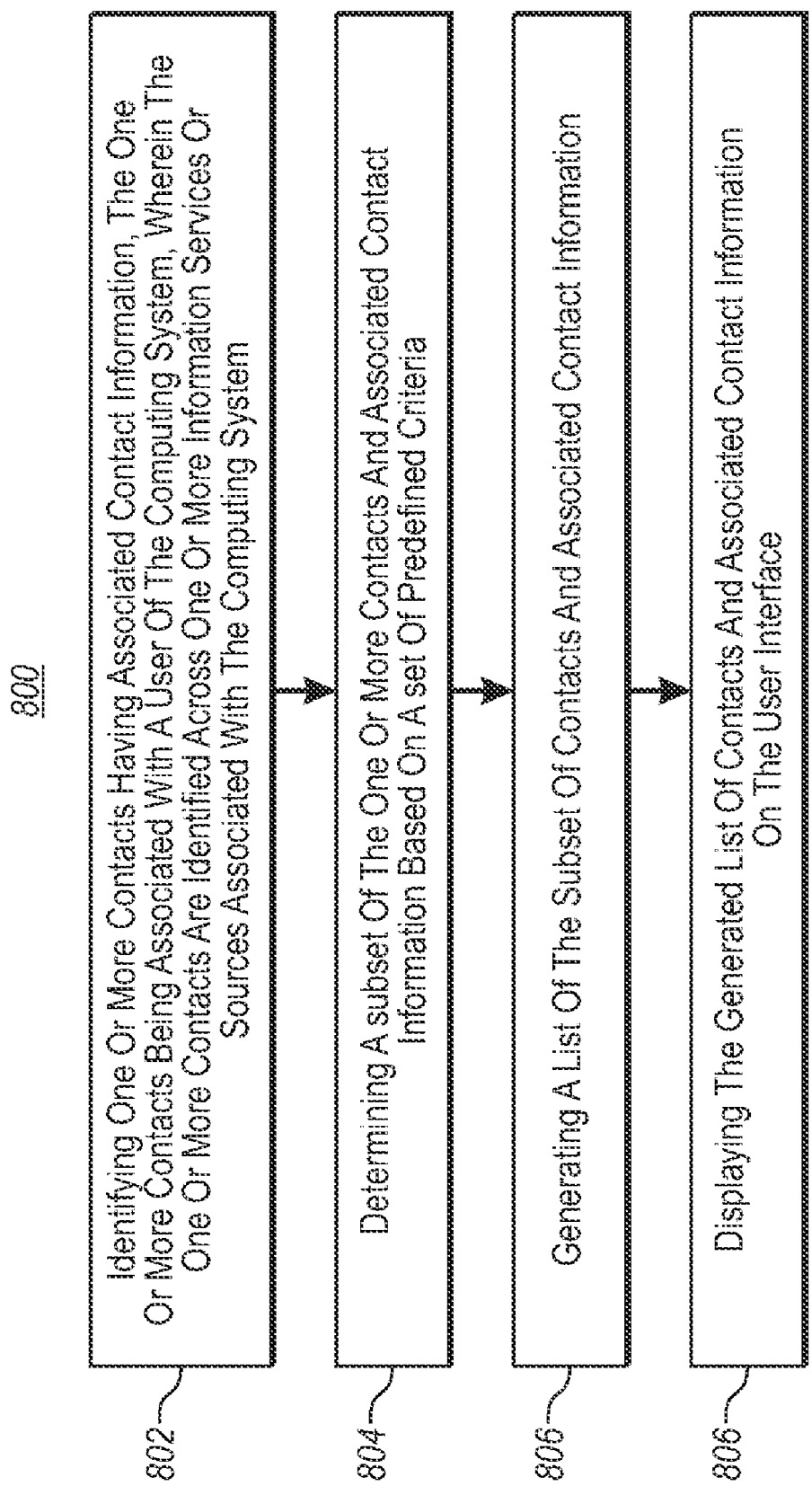
FIG. 8 illustrates a flowchart of a method for a computing system to dynamically generate and display a contacts list in accordance with the principles of the present invention.

Reference is now made to FIG. 8, which illustrates a flowchart of a method 800 for a computing system to dynamically generate and display a contacts list. The method includes at 802 identifying one or more contacts having associated contact information, the one or more contacts being associated with a user of the computing system, wherein the one or more contacts are identified across one or more information services or sources associated with the computing system. For example, A-list application 138, specifically monitor module 210, identifies contacts and their associated contact information. As has been explained, the contacts may be identified across multiple sources or services of system 100 that the user has access to.

The method also includes at 804 determining a subset of the one or more contacts and associated contact information based on a set of predefined criteria. For example, A-list application 138, specifically aggregation module 220, uses the identified contacts and determines a subset of the contacts based on criteria 139A.

The method further includes at 806 generating a list of the subset of contacts and associated contact information and at 808 displaying the generated list of contacts and associated contact information on the user interface. For example A-list application 138, specifically generation module 230, may generate an A-list 142 and then display the A-list on a GUI 140 as previously described.

Embodiments included general-purpose and/or special-purpose devices or systems that include both hardware and/or software components. Embodiments may also include physical computer-readable media and/or intangible computer-readable media for carrying or having computer-executable instructions, data structures, and/or data signals stored thereon. Such physical computer-readable media and/or intangible computer-readable media can be any available media that can be accessed by a general purpose or special purpose computer. By way of example, and not limitation, such physical computer-readable media can include RAM, ROM, EEPROM, CD-ROM or other optical disk storage, magnetic disk storage or other magnetic storage devices, other semiconductor storage media, or any other physical medium which can be used to store desired data in the form of computer-executable instructions, data structures and/or data signals, and which can be accessed by a general purpose or special purpose computer.

When information is transferred or provided over a network or another communications connection (either hardwired, wireless, or a combination of hardwired or wireless) to a computer, hardwired devices for sending and receiving computer-executable instructions, data structures, and/or data signals (e.g., wires, cables, optical fibers, electronic circuitry, chemical, and the like) should properly be viewed as physical computer-readable mediums while wireless carriers or wireless mediums for sending and/or receiving computer-executable instructions, data structures, and/or data signals (e.g., radio communications, satellite communications, infrared communications, and the like) should properly be viewed as intangible computer-readable mediums. Combinations of the above should also be included within the scope of computer-readable media.

Computer-executable instructions include, for example, instructions, data, and/or data signals which cause a general purpose computer, special purpose computer, or special purpose processing device to perform a certain function or group of functions. Although the subject matter has been described in language specific to module features and/or methodological acts, it is to be understood that the subject matter defined in the appended claims is not necessarily limited to the specific features or acts described above. Rather, the specific features and acts described above are disclosed as exemplary only.

Embodiments include general-purpose and/or special-purpose devices or systems that include both hardware and/or software components. Embodiments may also include physical computer-readable media and/or intangible computer-readable media for carrying or having computer-executable instructions, data structures, and/or data signals stored thereon. Such physical computer-readable media and/or intangible computer-readable media can be any available media that can be accessed by a general purpose or special purpose computer. By way of example, and not limitation, such physical computer-readable media can include RAM, ROM, EEPROM, CD-ROM or other optical disk storage, magnetic disk storage or other magnetic storage devices, other semiconductor storage media, or any other physical medium which can be used to store desired data in the form of computer-executable instructions, data structures and/or data signals, and which can be accessed by a general purpose or special purpose computer. Within a general purpose or special purpose computer, intangible computer-readable media can include electromagnetic means for conveying a data signal from one part of the computer to another, such as through circuitry residing in the computer.

When information is transferred or provided over a network or another communications connection (either hardwired, wireless, or a combination of hardwired or wireless) to a computer, hardwired devices for sending and receiving computer-executable instructions, data structures, and/or data signals (e.g., wires, cables, optical fibers, electronic circuitry, chemical, and the like) should properly be viewed as physical computer-readable mediums while wireless carriers or wireless mediums for sending and/or receiving computer-executable instructions, data structures, and/or data signals (e.g., radio communications, satellite communications, infrared communications, and the like) should properly be viewed as intangible computer-readable mediums. Combinations of the above should also be included within the scope of computer-readable media.

Computer-executable instructions include, for example, instructions, data, and/or data signals which cause a general purpose computer, special purpose computer, or special purpose processing device to perform a certain function or group of functions. Although not required, aspects of the invention have been described herein in the general context of computer-executable instructions, such as program modules, being executed by computers, in network environments and/or non-network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

Embodiments may also include computer program products for use in the systems of the present invention, the computer program product having a physical computer-readable medium having computer readable program code stored thereon, the computer readable program code comprising computer executable instructions that, when executed by a processor, cause the system to perform the methods of the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a computing system comprising a user interface, a method for dynamically generating and displaying a contacts list, the method comprising:
   identifying one or more contacts having associated contact information, the one or more contacts being associated with a user of the computing system, wherein the one or more contacts are identified across one or more information services or sources associated with the computing system;
   determining a first subset of the one or more contacts and associated contact information based on a first set of predefined criteria, the first set of predefined criteria including:
      proximity of the one or more contacts in the first subset relative to the user of the computing system; and
      a first topic discussed in a message sent by the one or more contacts in the first subset;
   determining a second subset of the one or more contacts based on a second set of predefined criteria, the second set of predefined criteria including a second topic discussed in a message sent by the one or more contacts in the second subset;
   generating a list of the first subset of contacts and associated contact information;
   displaying the generated list of the first subset of contacts and associated contact information on the user interface; and
   prohibiting the one or more contacts in the second subset from contacting the user of the computing system.

2. The method in accordance with claim 1, further comprising:
   determining, based on the first set of predefined criteria, that at least one contact and associated contact information of the displayed list of contacts are to no longer be included on the displayed list of contacts; and
   removing the at least one contact and associated contact information from the displayed list of contacts.

3. The method in accordance with claim 1, further comprising:
   determining, based on the first set of predefined criteria, that at least one contact and associated contact information of the identified contacts and associated contact information that are not included on the displayed list of contacts are to be added to the displayed list of contacts; and
   adding the at least one contact and associated contact information to the displayed list of contacts.

4. The method in accordance with claim 1, further comprising: defining a priority of the contact information that is to be used by the user of the computing system when contacting a member of the displayed list of contacts.

5. The method in accordance with claim 1, wherein the first set of predefined criteria further includes frequent activity.

6. The method in accordance with claim 1, wherein the associated contact information includes an email address, an instant messaging address, a phone number, video feeds, audio feeds, RSS feeds, and pictures or any combination thereof.

7. The method in accordance of claim 1, further comprising: indicating that changes have been made to the contact information associated with one or more contacts of the displayed contacts list.

8. The method in accordance with claim 1, wherein the proximity of the one or more contacts in the first subset relative to the user of the computing system is calculated using a global positioning system.

9. A computer program product comprising one or more physical non-transitory computer-readable storage media having thereon computer-executable instructions that are structured to cause, when executed by one or more processors of a computing system including a user interface, the computing system to perform a method for dynamically generating and displaying a contacts list, the method comprising:
   identifying one or more contacts having associated contact information, the one or more contacts being associated with a user of the computing system, wherein the one or more contacts are identified across one or more information services or sources associated with the computing system;
   determining a first subset of the one or more contacts and associated contact information based on a first set of predefined criteria, the first set of predefined criteria including:
      proximity of the one or more contacts in the first subset relative to the user of the computing system; and
      a first topic discussed in a message sent by the one or more contacts in the first subset;
   determining a second subset of the one or more contacts based on a second set of predefined criteria, the second set of predefined criteria including a second topic discussed in a message sent by the one or more contacts in the second subset;
   generating a list of the first subset of contacts and associated contact information;

displaying the generated list of the first subset of contacts and associated contact information on the user interface; and prohibiting the one or more contacts in the second subset from contacting the user of the computing system.

10. The computer program product as recited in claim 9, wherein the method further comprises:

determining, based on the first set of predefined criteria, that at least one contact and associated contact information of the displayed list of contacts are to no longer be included on the displayed list of contacts; and removing the one or more contacts and associated contact information from the displayed list of contacts.

11. The computer program product as recited in claim 9, wherein the method further comprises:

determining, based on the first set of predefined criteria, that at least one contact and associated contact information of the identified contacts and associated contact information that are not included on the displayed list of contacts are to be added to the displayed list of contacts; and adding the at least one contact and associated contact information to the displayed list of contacts.

12. The computer program product as recited in claim 9, wherein the method further comprises: defining a priority of the contact information that is to be used by the user of the computing system when contacting a member of the displayed list of contacts.

13. The computer program product as recited in claim 9, wherein the method further comprises: indicating that changes have been made to the contact information associated with one or more contacts of the displayed contacts list.

14. The computer program product as recited in claim 9, wherein the physical non-transitory computer-readable storage media includes one of RAM, ROM, EEPROM, CD-ROM, other optical disk storage, magnetic disk storage or other magnetic storage devices.

15. The computer program product as recited in claim 9, wherein the proximity of the one or more contacts in the first subset relative to the user of the computing system is calculated using a global positioning system.

16. A computing system comprising:

means for identifying one or more contacts having associated contact information, the one or more contacts being associated with a user of the computing system, wherein the one or more contacts are identified across one or more information services or sources associated with the computing system;

means for determining a first subset of the one or more contacts and associated contact information based on a first set of predefined criteria, the first set of predefined criteria including:

proximity of the one or more contacts in the first subset relative to the user of the computing system; and a first topic discussed in a message sent by the one or more contacts in the first subset;

means for determining a second subset of the one or more contacts based on a second set of predefined criteria, the second set of predefined criteria including a second topic discussed in a message sent by the one or more contacts in the second subset;

means for generating a list of the first subset of contacts and associated contact information;

means for displaying the generated list of the first subset of contacts and associated contact information on a user interface; and means for prohibiting the one or more contacts in the second subset from contacting the user of the computing system.

17. The computing system as recited in claim 16, wherein the proximity of the one or more contacts in the first subset relative to the user of the computing system is calculated using a global positioning system.

\* \* \* \* \*